(12) United States Patent
Honigfort et al.

(10) Patent No.: US 6,465,102 B1
(45) Date of Patent: Oct. 15, 2002

(54) FORMED DECORATIVE ARTICLE

(75) Inventors: Paul Honigfort, Evansville, IN (US); Gabrie Hoogland, Breda (NL); Michael M. Laurin, Pittsfield, MA (US); Adelbert Hermannus Leonardus Groothuis, Bergen op Zoom (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/892,718

(22) Filed: Jun. 18, 2001

Related U.S. Application Data

(63) Continuation-in-part of application No. 09/815,350, filed on Mar. 22, 2001.

(51) Int. Cl.[7] .............................................. B32B 27/36
(52) U.S. Cl. ...................................................... 428/412
(58) Field of Search ......................................... 428/412

(56) References Cited

U.S. PATENT DOCUMENTS

| | | |
|---|---|---|
| 2,465,319 A | 3/1949 | Whinfled et al. |
| 2,675,390 A | 4/1954 | Rosenblatt |
| 2,888,484 A | 5/1959 | Dehm et al. |
| 3,028,365 A | 4/1962 | Schnell et al. |
| 3,038,365 A | 6/1962 | Peterson |
| 3,047,539 A | 7/1962 | Pengilly |
| 3,153,008 A | 10/1964 | Fox |
| 3,334,154 A | 8/1967 | Kim |
| 3,444,237 A | 5/1969 | Jaffe |
| 3,635,895 A | 1/1972 | Kramer |
| 3,654,062 A | 4/1972 | Loew |
| 4,001,184 A | 1/1977 | Scott |
| 4,123,436 A | 10/1978 | Holub et al. |
| 4,125,572 A | 11/1978 | Scott |
| 4,131,575 A | 12/1978 | Adelmann et al. |
| 4,351,920 A | 9/1982 | Ariga et al. |
| 4,391,954 A | 7/1983 | Scott |
| 4,662,966 A | 5/1987 | Sumi et al. |
| 4,754,064 A | 6/1988 | Lillwitz |
| 5,441,997 A | 8/1995 | Walsh et al. |
| 6,117,384 A | 9/2000 | Laurin et al. |
| 6,136,441 A | 10/2000 | MacGregor et al. |

*Primary Examiner*—Terressa M. Boykin

(57) ABSTRACT

An article comprises a formed polymeric base comprising a substantially transparent cycloaliphatic polyester resin having a decorative surface area which may have an opening for exposing the transparent polymeric base resin to the exterior of the molded article, and a process for making the molded structure is described.

46 Claims, 1 Drawing Sheet

FORMED DECORATIVE ARTICLE

This application is a continuation-in-part of co-pending application Ser. No. 09/815,350 filed Mar. 22, 2001 and entitled Insert Molded Article.

FIELD OF INVENTION

This invention relates to an article with a substrate or film adjacent a formed base material.

BACKGROUND OF THE INVENTION

In a typical in-mold decorating process (IMD), a printed substrate is formed into a three-dimensional shape and placed into a mold. Molten resin is then injected into the mold cavity space behind the formed substrate to form a single molded part.

IMD may involve two types of film processes. According to one process, the film is a permanent fixture of the finished good. In this case, the film may act as the aesthetic effect carrier, or as a protective layer for the base resin, aesthetic effect, or both. Good adhesion is desired between the film, such as a polycarbonate type film, and the base resin.

According to another process, the film may be a temporary carrier for the aesthetic effect. In this case a base resin may be back-molded to the IMD film. The film is subsequently peeled off of the base resin, transferring or leaving an aesthetic material or design on the substrate resin. Good adhesion is not desired between the film, which may be a poly (ethylene terephthalate) type film and the substrate resin.

For both types of in-mold decorating (IMD) applications, ink washout of the IMD film is an inherent problem. When an ink (or other aesthetic enhancement) bearing or containing film is back-molded by a base resin, the aesthetic ink or effect material is often sandwiched between the IMD film and the substrate resin. The resulting shear from the back-molding injection of the substrate resin material against the IMD film, coupled with the heat of the molten substrate resin may cause the ink (or aesthetic bearing material) to detach itself from the IMD film. As a result, an area of decreased ink concentration, or "washout" may form. This washout is caused by several processing factors of the substrate resin, including processing temperature and injection shear.

Other challenges during the IMD process sheet or foil breakage or wrinkling which may be a result of the high pressures and temperatures needed to back mold.

A resin used as an IMD base material is a blend of polycarbonate (PC) with ABS (acrylonitrile-butadiene-styrene), such as a CYCOLY® resin produced by GE Plastics. PC/ABS blends have typically have enhanced shear thinning which enables the molder to fill the mold at lower injection rates and temperatures.

U.S. Pat. No. 3,654,062 to Loew describes a molded decorative plaque having a laminated facing sheet, which has the configuration of the mold. Heated plastic is injection molded behind the sheet to form the plaque. U.S. Pat. No. 6,117,384 to Laurin et al. describes a process where colors are decorated into a single film, which is then incorporated with a molten resin injected behind the film to produce a permanently bonded three-dimensional piece. U.S. Pat. No. 4,391,954 to Scott describes a thermoplastic molding composition comprising an aromatic carbonate polymer and a polyester derived from a cyclohexanedimethanol. U.S. Pat. No. 4,125,572 to Scott describes a thermoplastic molding composition comprising an aromatic carbonate polymer and a polyester derived from an aliphatic or cycloaliphatic diol. U.S. Pat. No. 4,662,966 to Nissha Printing Co. Ltd. describes a transfer-printing machine where designs of a diffusible dye on a transfer sheet are transferred to heated articles.

For the base material, it is desired to have a high clarity material with improved chemical resistance and with low temperature impact. The chemical resistance of many transparent and translucent amorphous materials is not sufficient against chemicals like oleic acid or sun tanning lotions, which are considered to be important chemicals in qualifying new materials for molding applications in for use in telecom and electronics businesses.

SUMMARY OF INVENTION

A molded structure comprises a decorative surface area with an integrally formed polymeric base which comprises a substantially transparent or translucent cycloaliphatic polyester resin. In one embodiment, the decorative area is integral with or forms a part of an adjacent formed substrate. The decorative surface may be formed directly on the surface of the polymeric base such as by a transfer process. In another embodiment, the decorative surface comprises a film or other substrate, which is back molded with the transparent cycloaliphatic polyester resin. In this embodiment, the substrate may have at least one opening which exposes the transparent polymeric base resin to the exterior of the molded article.

According to a molding method embodiment, a printed substrate is formed into a three-dimensional shape and placed into a mold. Molten resin is then injected into the mold cavity space behind the formed substrate, forming a single molded part.

The use of a transparent cycloaliphatic polyester resin as the injection molded base material obviates disadvantages encountered with non-transparent PC/ABS type blends. Lack of transparency may be a significant drawback in certain applications. For instance, for some cell phones, a film (PET) with ink patterns is back molded with a transparent resin to mold the complete front cover. This is done so that information can be visually accessed by the product's user through an opening positioned in the film or sheet, which is integrated into the structural resin of the product's design so as to form a transparent window. During back molding, the injection molded material projects into an opening in the film to form the window.

According to another process, during the back molding, ink may be transferred from a film to the transparent base resin. Removal of the film, dye or ink is transferred to the base material resulting in a decorated front cover. An example of transfer printing is the Nissha process. See U.S. Pat. No. 4,662,966 to Sumi et al. According to the process set forth, articles to be transferred-printed are heated such as by infrared radiation. A transfer sheet having an image or aesthetic effect formed thereon with a diffusible dye is pressed against the surface of the articles so that the aesthetic effect is transferred to the surfaces of the heated articles. The transfer sheet is then removed. According to one embodiment, the article, which may be pressed against the transfer sheet by back molding or the application of pressure, may be a transparent cycloaliphatic polyester resin. According to another embodiment, the transfer sheet, which carries the diffusible dye, may comprise a cycloaliphatic polyester resin.

For some applications, the film of substrate material may be a permanent aesthetic part of the finished product. For some wireless personal electronic applications which may use a film such as a polycarbonate (PC) film with ink patterns which is back molded with a transparent resin to mold the complete product housing. The transparent base material is molded to create a transparent window. Data may be transferred to/from the electronic product to its server by IR through the transparent window which is integrated into the structural resin of the product. Holes in the film expose the transparent injected molded base resin for either data transfer or aesthetic purposes.

One possibility for a transparent material is polycarbonate (PC). Typically, the processing temperature and injection shear (viscosity) of PC results in washout of ink on the IMD film at the injection gate. Other higher flow transparent materials like LEXAN® SP resin, a super high flow PC grade produced by GE Plastics component of General Electric Company give an improvement in terms of viscosity, but have a very small processing window and as such are not very robust. Even these higher flow materials are not suitable for thinner-walled IMD parts where their fast injection speeds will still result in IMD washout and other issues as described above (e.g. foil breakage). In addition, physical properties, especially impact of LEXAN SP resin and other such high-flow products are also not sufficient for use in many IMD applications.

Cycloaliphatic polyester and polycarbonate blends, with or without an impact modifier are utilized as a back-molded resin for in-mold decorated (IMD) film applications. Transparent blends of polycarbonate (PC) and poly(cyclohexane dimethanol cyclohexane dicarboxylate) (PCCD) which posses lower processing temperatures and improved flow characteristics over standard PC materials. This results in slower injection speeds and lower injection shear in an injection molded IMD part when compared to other transparent back-molding substrate resins (such as Lexan SP) for in-mold decorating (IMD) applications. This in turn results in a decrease of the washout effect in IMD applications. These blends also offer superior chemical resistance and ductility to that of most transparent resin materials. The complete miscibility of this system allows the properties of the resulting blend to be dialed in, via blend ratio, while still maintaining transparency.

Two types of cycloaliphatic polyesters may desirable can be used with BPA-based polycarbonate to give the compositions and articles of this invention. The most preferred polyester molecules are derived from cycloaliphatic diol and cycloaliphatic diacid compounds, specifically polycyclohexane dimethanol cyclohexyl dicarboxylate (PCCD). The polyester having only one cyclic unit may also be useful.

In addition, PCCD and PC can be blended with certain impact modifiers (IM) at such ratios as to match the refractive index (RI) of the impact modifier to that of the PC/PCCD blend and therefore still retain transparency. In addition to the characteristics of PC/PCCD resins, these PC/PCCD/IM blends possess improved low temperature ductility which can be a key requirements for IMD applications, for example, cellphone covers.

The present invention is directed to multi-layer plastic articles and methods for making such articles. More particularly, the articles comprise a base layer of an injection molded thermoplastic and surface layer of a decorated film or a transferred aestheticly decorative surface.

The desired multi-layered films have favorable properties of formability, low birefringence, chemical, UV radiation resistance, and optical transparency. These laminated films are well suited for exterior automotive insert mold decoration (IMD) applications. According to an IMD process, a formed, and decorated film is placed in a mold and the thermoplastic melt, which forms the base layer, is injection molded to the exposed surface of the film.

DETAILED DESCRIPTION OF THE INVENTION

Figure 1:
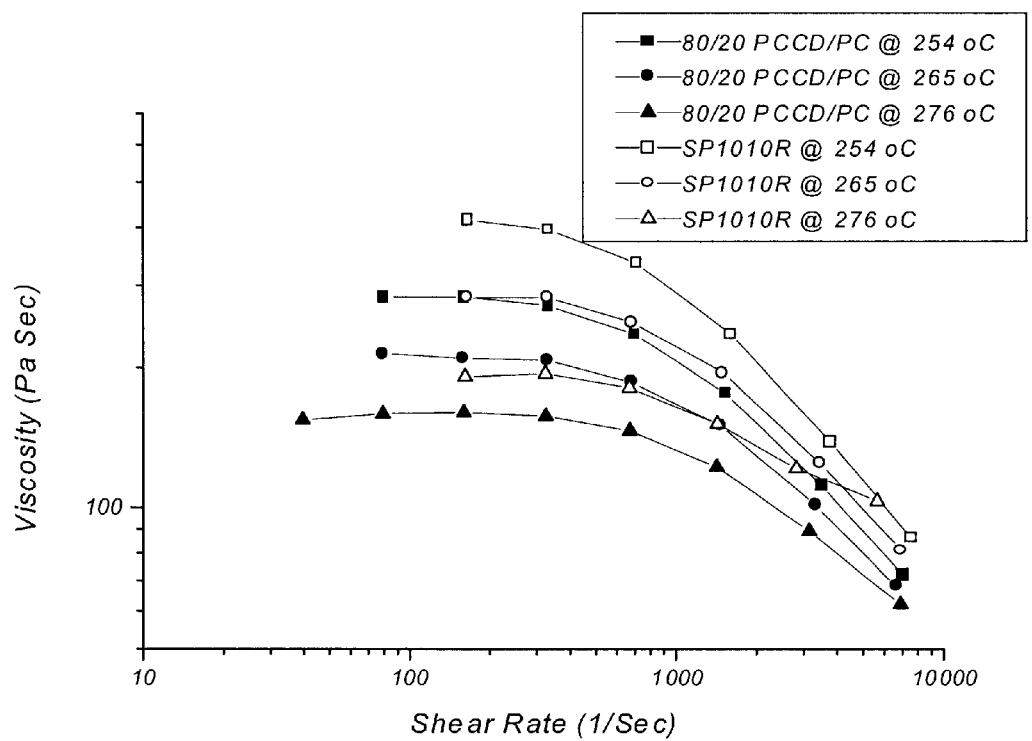
FIG. 1, the only figure, illustrates melt capillary curves.

The formed article comprises a substantially transparent resin comprising a cycloaliphatic polyester resin formed adjacent a decorative or aesthetic material for imparting the decorative or aesthetic effect. The process for creating the decorative or aesthetic effect comprises forming a resin comprising a substantially transparent cycloaliphatic polyester into a desired shape adjacent a decorative or aesthetic material wherein the decorative or aesthetic effect is imparted to the formed article.

According to one embodiment, molded articles are prepared by the steps of:
1. providing a decorative substrate, such as polycarbonate, having one or more colors on a surface, for example by screen printing or by a transfer dye;
2. conforming the decorative substrate to a mold configuration such as by forming and trimming a printed substrate into a three-dimensional shape and fitting the printed substrate into a mold having a surface which matches the there-dimensional shape of the substrate: and
3. injecting a substantially transparent resin comprising a blend of cycloaliphatic polyester resin and a polycarbonate resin, into the mold cavity behind the printed substrate to i) produce a one-piece permanently bonded three-dimensional product or ii) transfer a pattern or aesthetic effect to the cycloaliphatic polyester resin and removing the printed substrate and imparting the aesthetic effect to the formed cycloaliphatic resin.

The injection molded substantially transparent resin comprises a transparent cycloaliphatic polyester resin and more preferably a cycloaliphatic polyester resin blended with polycarbonate.

In cases where the polycarbonate has a high Tg and is difficult to process the cycloaliphatic polyester acts to lower the PC Tg. A blend with a cycloaliphatic polyester reduces Tg making melt processing easier while the blend has excellent optical properties overall. The most preferred materials will be blends where the polyester has both cycloaliphatic diacid and cycloaliphatic diol components specifically polycyclohexane dimethanol cyclohexyl dicarboxylate (PCCD). The preferred polycarbonate will be composed of units of BPA, SBI bis phenol, aryl substituted bisphenols, cycloaliphatic bisphenols and mixtures thereof. It is contemplated that acidic phosphorus based stabilizers are useful to retard melt reaction of the cycloaliphatic polyester and polycarbonate resin and improve color.

The ratio of cycloaliphatic polyester to polycarbonate in the range of 20:80 to 70:30 by weight. Other useful ranges include 40:60 to 5:95 by weight. Blends from 50:50 to 30:70 are also desirable. Less than 70 weight percent polyester is desirable for a lower heat deflection temperature resulting in improved performance as compared to polycarbonate alone. The presence of the cycloaliphatic polyester results in enhanced chemical resistance and enhanced UV resistance as compared to a base polymeric consisting entirely of polycarbonate. The resulting cycloaliphatic polycarbonate blend desirable has a glass transition temperature of from about 90 to 150° C. and a transmittance of greater than or equal to 75%. Desirable impact modifiers have properties which do not do not effect the desirable transparent properties and have a refractive index (RI) between 1.51 and 1.58%. Other desirable properties include a chemical resistance of the cycloaliphatic polyester and polycarbonate resin between about one and about 4 percent with Critical Stain as measured with Bergen Jig versus coppertone, oleic acid and xylene. Preferbly the Melt Volume Rate is 300 degrees Centigrade/1.2 kg between 35 and 60 ml/10 min., with a Flexural Modulus between 2200 and 1400 Mpa, and an Heat Deflection Temperature 1.82 Mpa between 115 and 70 degrees Centigrade. Injection molding of the cycloalliphatic polycarbonate blend is preferably performed at a temperature from about 230 to about 300 degrees Centigrade. Due to its lower viscosity at lower melt temperatures as compared to polycarbonate, the PCCD/PC blend is able to backfill the IMD part at a lower injection temperature and pressure then polycarbonate material. Preferably, the polycarbonate is BPA-PC and the cycloaliphatic polyester is PCCD.

The cycloaliphatic polyester resin comprises a polyester having repeating units of the formula I:

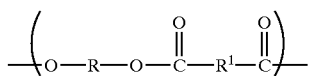

where at least one R or R1 is a cycloalkyl containing radical.

The polyester is a condensation product where R is the residue of an aryl, alkane or cycloalkane containing diol having 6 to 20 carbon atoms or chemical equivalent thereof, and R1 is the decarboxylated residue derived from an aryl, aliphatic or cycloalkane containing diacid of 6 to 20 carbon atoms or chemical equivalent thereof with the proviso that at least one R or R1 is cycloaliphatic. Preferred polyesters of the invention will have both R and R1 cycloaliphatic.

The present cycloaliphatic polyesters are condensation products of aliphatic diacids, or chemical equivalents and aliphatic diols, or chemical equivalents. The present cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols. The cyclic components are desirable to enhance the formation of transparent blends due to favorable interaction with the polycarbonate resin.

The polyester resins are typically obtained through the condensation or ester interchange polymerization of the diol or diol equivalent component with the diacid or diacid chemical equivalent component.

R and R1 are preferably cycloalkyl radicals independently selected from the following formula:

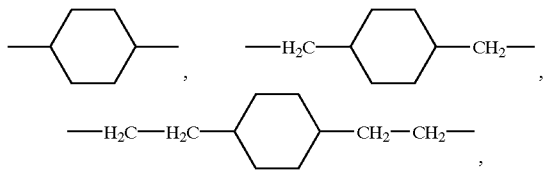

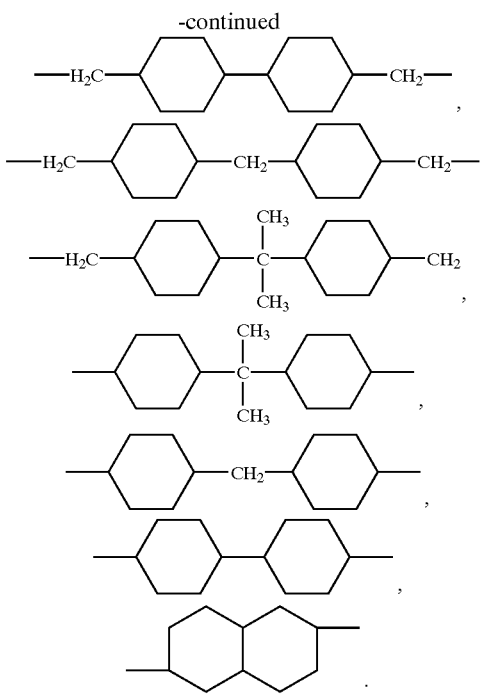

The preferred cycloaliphatic radical R1 is derived from the 1,4-cyclohexyl diacids and most preferably greater than 70 mole % thereof in the form of the trans isomer. The preferred cycloaliphatic radical R is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 16 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD), triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. See, Friefelder et al., Journal of Organic Chemistry, 31, 3438 (1966); U.S. Pat. Nos. 2,675,390 and 4,754,064. They may also be prepared by the use of an inert liquid medium in which a phthalic acid is at least partially soluble under reaction conditions and with a catalyst of palladium or ruthenium on carbon or silica. See, U.S. Pat. Nos. 2,888,484 and 3,444,237.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula II:

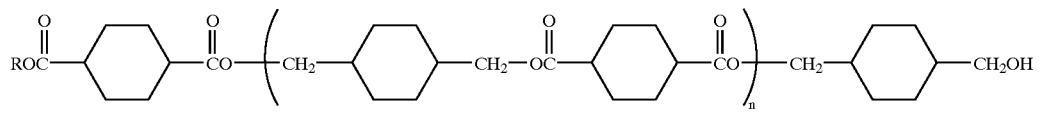

With reference to the previously set forth general formula, for PCCD, R is derived from 1,4 cyclohexane dimethanol; and R1 is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl) titanate, in a suitable amount, typically about 50 to 200 ppm of titanium based upon the final product.

The preferred aliphatic polyesters used in the present transparent molding compositions have a glass transition temperature (Tg) which is above 50° C., more preferably above 80° C. and most preferably above about 100° C.

Also contemplated herein are the above polyesters with from about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047, 539.

Polycarbonates useful in the invention comprise the divalent residue of dihydric phenols, Ar', bonded through a carbonate linkage and are preferably represented by the general formula III:

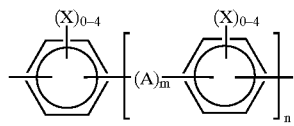

wherein A is a divalent hydrocarbon radical containing from 1 to about 15 carbon atoms or a substituted divalent hydrocarbon radical containing from 1 to about 15 carbon atoms; each X is independently selected from the group consisting of hydrogen, halogen, and a monovalent hydrocarbon radical such as an alkyl group of from 1 to about 8 carbon atoms, an aryl group of from 6 to about 18 carbon atoms, an arylalkyl group of from 7 to about 14 carbon atoms, an alkoxy group of from 1 to about 8 carbon atoms; and m is 0 or 1 and n is an integer of from 0 to about 5. Ar' may be a single aromatic ring like hydroquinone or resorcinol, or a multiple aromatic ring like biphenol or bisphenol A.

The dihydric phenols employed are known, and the reactive groups are thought to be the phenolic hydroxyl groups. Typical of some of the dihydric phenols employed are bis-phenols such as bis(4-hydroxyphenyl)methane, 2,2-bis (4-hydroxyphenyl)propane (also known as bisphenol-A), 2,2-bis(4-hydroxy-3,5-dibromo-phenyl)propane; dihydric phenol ethers such as bis(4-hydroxyphenyl)ether, bis(3,5-dichloro-4-hydroxyphenyl)ether; p,p'-dihydroxydiphenyl and 3,3'-dichloro-4,4'-dihydroxydiphenyl; dihydroxyaryl sulfones such as bis(4-hydroxyphenyl)sulfone, bis(3,5-dimethyl-4-hydroxyphenyl)sulfone, dihydroxy benzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxy-phenyl)sulfoxide and bis(3,5-dibromo-4-hydroxyphenyl)sulfoxide. A variety of additional dihydric phenols are available and are disclosed in U.S. Pat. Nos. 2,999,835, 3,028,365 and 3,153,008; all of which are incorporated herein by reference. It is, of course, possible to employ two or more different dihydric phenols or a combination of a dihydric phenol with a glycol.

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate are preferred.

The aromatic polycarbonates can be manufactured by any processes such as by reacting a dihydric phenol with a carbonate precursor, such as phosgene, a haloformate or carbonate ester in melt or solution. U.S. Pat. No. 4,123,436 describes reaction with phosgene and U.S. Pat. No. 3,153, 008 describes a transesterification process.

Preferred polycarbonate will be made of dihydric phenols that result in resins having low birefringence for example dihydric phenols having pendant aryl or cup shaped aryl groups like:

Phenyl-di(4-hydroxyphenyl) ethane (acetophenone bisphenol):

Diphenyl-di(4-hydroxyphenyl) methane (benzophenone bisphenol):

2,2-bis(3-phenyl-4-hydroxyphenyl) propane 2,2-bis-(3,5-diphenyl-4-hydroxyphenyl) propane;

bis-(2-phenyl-3-methyl-4-hydroxyphenyl) propane;

2,2'-bis(hydroxyphenyl)fluorene;

1,1-bis(5-phenyl-4-hydroxyphenyl)cyclohexane;

3,3'-diphenyl-4,4'-dihydroxy diphenyl ether;

2,2-bis(4-hydroxyphenyl)-4,4-diphenyl butane;

1,1-bis(4-hydroxyphenyl)-2-phenyl ethane;

2,2-bis(3-methyl-4-hydroxyphenyl)-1-phenyl propane;

6,6'-dihdyroxy-3,3,3', 3'-tetramethyl-1,1'-spiro(bis) indane;

(hereinafter "SBI"), or dihydric phenols derived from spiro biindane of formula IV:

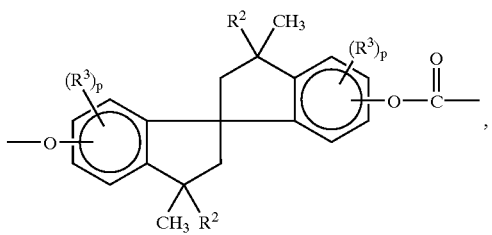

(I)

Units derived from SBI and its 5-methyl homologue are preferred, with SBI being most preferred.

Other dihydric phenols which are typically used in the preparation of the polycarbonates are disclosed in U.S. Pat. Nos. 2,999,835, 3,038,365, 3,334,154 and 4,131,575. Branched polycarbonates are also useful, such as those described in U.S. Pat. Nos. 3,635,895 and 4,001,184. Polycarbonate blends include blends of linear polycarbonate and branched polycarbonate.

It is also possible to employ two or more different dihydric phenols or a copolymer of a dihydric phenol with an aliphatic dicarboxylic acids like; dimer acids, dodecane dicarboxylic acid, adipic acid, azelaic acid in the event a carbonate copolymer or interpolymer rather than a homopolymer is desired for use in the preparation of the polycarbonate mixtures of the invention. Most preferred are aliphatic C5 to C12 diacid copolymers.

The preferred polycarbonates are preferably high molecular weight aromatic carbonate polymers have an intrinsic viscosity (as measured in methylene chloride at 25° C.) ranging from about 0.30 to about 1.00 dl/gm. Polycarbonates may be branched or unbranched and generally will have a weight average molecular weight of from about 10,000 to about 200,000, preferably from about 20,000 to about 100,000 as measured by gel permeation chromatography. It is contemplated that the polycarbonate may have various known end groups.

In the thermoplastic compositions which contain a cycloaliphatic polyester resin and a polycarbonate resin it is preferable to use a stabilizer or quencher material. Catalyst quenchers are agents which inhibit activity of any catalysts which may be present in the resins. Catalyst quenchers are described in detail in U.S. Pat. No. 5,441,997. It is desirable to select the correct quencher to avoid color formation and loss of clarity to the polyester polycarbonate blend.

A preferred class of stabilizers including quenchers are those which provide a transparent and colorless product. Typically, such stabilizers are used at a level of 0.001–10 weight percent and preferably at a level of from 0.005–2 weight percent. The favored stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof. The suitability of a particular compound for use as a stabilizer and the determination of how much is to be used as a stabilizer may be readily determined by preparing a mixture of the polyester resin component and the polycarbonate and determining the effect on melt viscosity, gas generation or color stability or the formation of interpolymer. The acidic phosphate salts include sodium dihydrogen phosphate, mono zinc phosphate, potassium hydrogen phosphate, calcium dihydrogen phosphate and the like. The phosphites may be of the formula V:

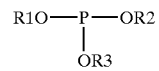

where R1, R2 and R3 are independently selected from the group consisting of hydrogen, alkyl and aryl with the proviso that at least one of R1, R2 and R3 is hydrogen.

The phosphate salts of a Group IB or Group IIB metal include zinc phosphate and the like. The phosphorus oxo acids include phosphorous acid, phosphoric acid, polyphosphoric acid or hypophosphorous acid.

The polyacid pyrophosphates may be of the formula VI:

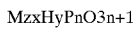

wherein M is a metal, x is a number ranging from 1 to 12 and y is a number ranging 1 to 12, n is a number from 2 to 10, z is a number from 1 to 5 and the sum of (xz)+y is equal to n+2. The preferred M is an alkaline or alkaline earth metal.

The most preferred quenchers are oxo acids of phosphorus or acidic organo phosphorus compounds. Inorganic acidic phosphorus compounds may also be used as quenchers, however they may result in haze or loss of clarity. Most preferred quenchers are phosphoric acid, phosphorous acid or their partial esters.

Mold releases such as pentaerythritol tetra esters, especially the stearate esters. Also preferred are carboxylic acid esters of other polyols like glycerol; for example glycerol mono stearate.

In one embodiment, the polycarbonate/cycloaliphatic polyester compositions may include than about 20 percent, and preferably less than about 15 percent of an impact modifier. Typical impact modifiers generally comprise an acrylic or methacrylic grafted polymer of a conjugated diene or an acrylate elastomer, alone, or copolymerized with a vinyl aromatic compound. In general these impact modifiers contain units derived from butadiene or isoprene, alone or in combination with a vinyl aromatic compound, or butyl acrylate, alone or in combination with a vinyl aromatic compound. Other typical impact modifiers include, but are not limited to ethylene vinyl acetate, ethylene ethylacrylate copolymers, SEBS (styrene-ethylene-butylene styrene) and SBS (styrene-butadiene-styrene) block copolymers, EPDM (ethylene propylene diene monomer) and EPR (ethylene propylene rubber) copolymers, etc.

According to a another embodiment, transparent and highly ductile compositions can be obtained via the blending of poly(cyclohexane dimethanol cyclohexane dicarboxylate) (PCCD), PC and a transparent impact modifier with a refractive index (RI) between 1.51 and 1.58. The complete miscibility of PC and PCCD allows adjustment of the RI of the PC/PCCD blend to the RI of the impact modifier. There are many impact modifiers which are suitable and some examples are given to illustrate. Examples of such impact modifiers are a clear ABS (acrylonitrile-butadiene-styrene, RI=1.535) and typical PVC modifiers like Blendex 415/336 (ABS material) supplied by GE Plastics or Paraloid BTA 702/736 (MBS material) supplied by Rohm & Haas or Kane Ace B28/B58 (MBS material) supplied by Kaneka. All these PVC modifiers do have a RI between 1.53 and 1.55. These parts have a unique combination of impact, transparency and chemical resistance.

Additionally, additives such as mold releases, antioxidants lubricants, nucleating agents such as talc and the like, other stabilizers including but not limited to UV stabilizers, such as benzotriazole, supplemental reinforcing fillers, and the like, flame retardants, pigments or combinations thereof may be added to the compositions of the present invention.

It may be desirable to add visual effect additives like metal or mica flakes in combination with organic dyes which do not result in a significant increase in the brittle nature of the material. A colorant in the form of flakes may be present for imparting a desired coloration. Typically, the colorant flakes range in size between 17.5 and 650 microns are used in loadings of 0.01 to 20. 0 weight percent, preferably 0.10 to 15.0 weight percent, more preferably 0.25 to 10.0 weight percent, and most preferably 0.5 to 5.0 weight percent are preferred. The flakes are preferably metal flakes. The term metal flakes is intended to include thin particles including thin film, foil, or platelets which typically have a metallic appearance.[need to refine dimension info] Preferred metal particles are based on metals of Group I-B, III-A, IV, VI-B and VIII of the periodic table. Also, physical mixtures or alloys of these metals may be employed. Also, physical mixtures or alloys of these metals may be employed. Examples of these metals include aluminum, bronze, brass, chromium, copper, gold, iron, molybdenum, nickel, tin, titanium, zinc and the like. For most applications, a "corn-flake" type or corrugated irregularly shaped planar flake of aluminum or bronze is preferred, although a "silver dollar" type or a circular planar type of flake may also be utilized. Use of metal particles having two or more average flake sizes, i.e. at least two different average particle sizes, has been found to give much better control of the desired appearance and also been found to allow a greater consistency of achieving the desired appearance.

Aluminum flakes produce a satiny silver luster. In general, smaller particle sizes tend to have greater opacity and hiding power with a grayish effect, while larger flake sizes show greater brightness and reflectivity with increased metallic sparkle. Combination of particle sizes are utilized to balance tinctorial strength and specular effects in addition to providing control of look and consistency.

Glitter is a special type of aluminum pigment produced from foil. The foil, rolled to gauges of less than 0.001 inch, is cut into square, rectangular or hexagonal shapes in sizes from 0.008 to 0.125 inch and typically coated with a transparent epoxy lacquer to halt oxidative dulling of the foil. Glitter, with its large particle sizes, can produce discrete specular highlights.

Gold bronzes are actually brasses—alloys of copper and zinc with a small amount of aluminum to reduce oxidation. The range of gold colors is produced by varying proportions of major alloy components. The green golds contain 70 percent copper, and color becomes redder as the percentage of copper is increased; 90 percent copper produces pale gold; deep golds are made by controlled oxidation of the alloys. Gold bronzes are usually utilized in flake form, with coarser grades giving more brilliance. Copper must be utilized with care, however, as it is susceptible to heat, moisture and corrosives.

Lubricants such as ethylene bis stearamide, butyl stearate, glycerin or mineral oils or the like are sometimes included in the binder formulation, and may or may not be compatible with other blend components.

Other additional ingredients may include antioxidants, and UV absorbers, and other stabilizers. Antioxidants include i) alkylated monophenols, for example: 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6 dimethylphenol, 2,6-di-octadecyl-4-methylphenol, 2,4,6,-tricyclohexyphenol, 2,6-di-tert-butyl-4-methoxymethylphenol; ii) alkylated hydroquinones, for example, 2,6-di-tert-butyl-4-methoxyphenol, 2,5-di-tert-butyl-hydroquinone, 2,5-di-tert-amyl-hydroquinone, 2,6-diphenyl-4octadecyloxyphenol; iii) hydroxylated thiodiphenyl ethers; iv) alkylidene-bisphenols; v) benzyl compounds, for example, 1,3,5-tris-(3,5-di-tert-butyl-4-hydroxybenzyl)-2,4,6-trimethylbenzene; vi) acylaminophenols, for example, 4-hydroxy-lauric acid anilide; vii) esters of beta-(3,5-di-tert-butyl-4-hydroxyphenol)-propionic acid with monohydric or polyhydric alcohols; viii) esters of beta-(5-tert-butyl-4-hydroxy-3-methylphenyl)-propionic acid with monohydric or polyhydric alcohols; vii) esters of beta-(5-tert-butyl-4-hydroxy-3-methylphenyl) propionic acid with mono-or polyhydric alcohols, e.g., with methanol, diethylene glycol, octadecanol, triethylene glycol, 1,6-hexanediol, pentaerythritol, neopentyl glycol, tris(hydroxyethyl) isocyanurate, thiodiethylene glycol, N,N-bis(hydroxyethyl) oxalic acid diamide. Typical, UV absorbers and light stabilizers include i) 2-(2'-hydroxyphenyl)-benzotriazoles, for example, the 5'methyl-,3'5'-di-tert-butyl-,5'-tert-butyl-5'(1,1,3,3-tetramethylbutyl)-,5-chloro-3',5'-di-tert-butyl-,5-chloro-3'tert-butyl-5'methyl-,3'sec-butyl-5'tert-butyl-,4'-octoxy, 3',5'-ditert-amyl-3',5'-bis-(alpha, alpha-dimethylbenzyl)-derivatives; ii) 2.2 2-Hydroxy-benzophenones, for example, the 4-hydroxy-4-methoxy-,4-octoxy,4-decloxy-,4-dodecyloxy-,4-benzyloxy,4,2',4'-trihydroxy-and 2'hydroxy-4,4'-dimethoxy derivative, and iii) esters of substituted and unsubstituted benzoic acids for example, phenyl salicylate, 4-tert-butylphenyl-salicilate, octylphenyl salicylate, dibenzoylresorcinol, bis-(4-tert-butylbenzoyl)-resorcinol, benzoylresorcinol, 2,4-di-tert-butyl-phenyl-3,5-di-tert-butyl-4 hydroxybenzoate and hexadecyl-3,5-di-tert-butyl-4-hydroxybenzoate. Phosphites and phosphonites stabilizers, for example, include triphenyl phosphite, diphenylalkyl phosphites, phenyldialkyl phosphites, tris(nonyl-phenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite tristearyl sorbitol triphosphite, and tetrakis(2,4-di-tert-butylphenyl)4,4'-biphenylene diphosphonite.

Dyes or pigments, if desired, are typically organic dyes or pigment complexes which may be, in themselves, soluble in the resin matrix. These organic dyes and pigments include the following classes and examples: furnace carbon black, phthalocyanine blues or greens, anthraquinone dyes, scarlet 3b Lake, azo compounds and acid azo pigments, quinacridones, chromophthalocyanine pyrrols, halogenated phthalocyanines, quinolines, heterocyclic dyes, perinone dyes, anthracenedione dyes, thioxanthene dyes, parazolone dyes, polymethine pigments and others. It may be desirable to use small quantities of inorganic pigments such as $TiO_2$, iron oxide, cadmium-mercury compounds, cadmium-lithium compounds, etc. to achieve certain colors, but such inorganic pigments are generally not used.

The method of blending the compositions can be carried out by conventional techniques. One convenient method comprises blending the polyester or polycarbonate and other ingredients in powder or granular form, extruding the blend and comminuting into pellets or other suitable shapes. The ingredients are combined in any usual manner, e.g., by dry mixing or by mixing in the melted state in an extruder, on a heated mill or in other mixers. Colorants may be added to the extruder downstream of the feed port.

The flakes are incorporated into the resin composition by uniformly mixing into the desired resin composition. It is important flakes be stable at processing temperatures. Stability is desired at temperatures on the order of about 400, preferably at 500, and even more preferably 550 degrees F. Unstable flakes should be avoided.

The compositions may include various dyes and stabilizers which are added in effective amounts to impart the desired properties for specific applications.

The resin, including any impact modifier, may comprise less than 5 percent by weight additional ingredients which may be added to contribute to desirable properties previously mentioned of additional, important properties which include good mechanical properties, color stability, oxidation resistance, good flame retardancy, good processability, i.e. short molding cycle times, good flow, and good insulation properties.

One convenient method comprises blending the resins and other ingredients in powder or granular form, extruding the blend and comminuting into pellets or other suitable shapes. The ingredients are combined in any usual manner, e.g., by dry mixing or by mixing in the melted state in an extruder, on a heated mill or in other mixers. An alternative method of blending can comprise preparing a preblend of the polyesters and then adding the other ingredients to the preblend. For example, a preblend of the resins and stabilizer can be fed into the upstream port of an extruder with addition of the other ingredients such as glass fibers in a downstream port of the extruder. In another embodiment, the various compounds can be precompounded, pelletized and then molded. Precompounding can be carried out in conventional equipment. For example, a dry blend of the ingredients can be fed into a single screw extruder, the screw having a long transition section to insure proper melting. Alternatively, a twin screw extrusion machine can be fed with the resins and other additives at the feed port and reinforcements fed downstream. The pre-compounded composition can be extruded and cut or chopped into molding compounds, such as conventional granules, pellets, etc. by standard techniques. The compositions can be molded in any equipment conventionally used for thermoplastic compositions. For example, good results will be obtained in an injection molding machine, with conventional cylinder temperatures, e.g., 500° F., and conventional mold temperatures, e.g., 150° F.

In another embodiment, the various compounds can be pre-compounded pelletized and then extruded into films. These films can then be used as the decorative film in an IMD article where the film remains with the product for the life of the product.

The multi-layer films can be transparent, or opaque as desired. Transparent products are preferred embodiments of this invention. The fluoride polymer and polycarbonate layers are first laminated together. A variety of laminating techniques can be used. However, heat lamination is preferred. Acrylic adhesives are preferred for use in the present invention.

A preferred substrate or film is one formed from a thermoplastic polycarbonate material such as previously described. Typical examples of polycarbonate resins are described in U.S. Pat. No. 4,351,920, which is incorporated herein by reference, and are obtained by the reaction of aromatic dihydroxy compounds with phosgene. A preferred aromatic dihydroxy compound is 2,2-bis(4-hydroxy phenyl) propane, (i.e., Bisphenol-A). The term aromatic polycarbonate resins is also meant to include polyester carbonates obtained from the reaction products of a dihydroxy phenol, a carbonate precursor and a dicarboxylic acid such as terephthalic acid and isophthalic acid. Optionally an amount of a glycol may also be used as a reactant. A preferred grade of polycarbonate resin for the film is Lexan grade ML9103 available from General Electric Company. Polycarbonate film may be made by well-known methods. Typically, the molten thermoplastic is cast onto an extrusion roll stack, and both sides of the material are polished and pressed to a uniform thickness. Preferably the polycarbonate film has a thickness of from five (5) to twenty (20) mils.

It is contemplated that the film or substrate may have multiple layers which includes an outer weather resistant layer. An example of such a film or substrate are layers of a polycarbonate film layer or other transparent substrate; optionally, a layer of polyvinylidene fluoride ("PVDF") film or other material resistant to ultraviolet (UV) light laminated to the polycarbonate film; and a decorated layer, which may be varied as desired, and which is printed on the exposed surface of the polycarbonate layer.

One of the most efficient and cost-effective ways of decorating a part is to do it during the molding cycle. One way to accomplish this is by inserting a decorated substrate into the cavity of a molding tool and injecting plastic behind it. This process is generally known as in-mold decoration or insert mold decoration (IMD). The decoration for the finished part can either be exposed to the environment ("first surface decoration") and/or encapsulated between the substrate and the injected material ("second surface decoration").

Other parameters contribute to the preparation of the second surface decorated parts. First, high temperature, formable inks are preferably used for the graphics. Second surface decoration requires more robust ink systems to provide adequate ink adhesion during the molding process. Moreover, in applications such as light assemblies where light transmission is critical, dye inks should be used rather than pigmented inks so as not to affect light transmission and haze readings. Evaluation of many different inks indicates that many ink systems are not suitable for second surface decorating. Among those inks which are appropriate are the following: Naz-dar 9600, Coates C-37 Series, Coates UVIMD, Marabuwerke IMD Spezialfarbe 3061, Marabuwerke IMC 5001, Nor-cote (UK) IMD Series, Sericol Techmark MTS, Sericol Techmark IMD, Procell Noriphan HTR.

Prototype molds may be constructed from common materials such as plaster, hard woods, fiberglass, syntactic foam and silicone. These materials are relatively easy to work with and allow minor modifications. It is common practice for designers to experiment with IMD to cast a silicone forming mold off an existing injection mold. For example, production forming tools should be constructed of durable materials such as cast or machined aluminum, steel or metal filled epoxy. Conductive molds should be internally heated to a temperature of 250° F.

The formed part will contract in size once it is removed from the mold and allowed to cool. The amount of shrinkage depends on the material selected, but it is predictable and must be accounted for when calculating the mold dimensions. The same is true for the expansion of the mold at operating temperatures. For example, LEXAN® polycarbonate film will typically shrink approximately 0.5–0.9% after forming, depending on the mold. The thermal expansion properties of the mold material at an operating temperature of 250° F. must be subtracted from the film shrinkage number to obtain accurate mold dimensions. In addition, draft angles of 5 to 7 degrees are suggested to facilitate part removal from male molds. Female molds require less draft (1 to 2 degrees).

The basic considerations in gating are part design, flow, end use requirements and location of in-mold graphics. The standard guidelines of traditional gating apply to IMD along with several extra considerations. For example, one gate should be used whenever possible to minimize the potential for wrinkling the film. Gates should be located away from end-use impact as well as to provide flow from thick to thin sections to minimize weld lines. Gates should also be located at right angles to the runner to minimize jetting, splay and gate blush. Large parts requiring multiple gates should include gate positions close enough together to reduce pressure loss. Sequential gating may be used to prevent folding of the film at weld lines. Gate land lengths should be kept as short as possible. An impinging gate may be used to ensure that the incoming flow is directed against the cavity wall or core to prevent jetting. Venting (particularly full perimeter venting) may be accomplished by knock outs, cores and parting lines and should be used whenever possible to avoid trapped gas that can burn and rupture the film. In addition, flow restrictions near gate areas can increase the potential for wash out due to increased shear. If bosses, core shutoffs, etc., are needed near a gate, rounded features or corners should be used to reduce shear. Finally, care should also be taken to ensure that the gating distributes the injection pressure over a large area, thus reducing the shear forces at the gate. Examples of gates that accomplish this include fan gates and submarine gates that enter the part via a rib.

When selecting a resin, it is advantageous that the resin's viscosity be sufficiently low such that the pressure necessary to inject it into the mold may be reduced. In addition, the injection may be profiled so that the viscosity of the injected material maintained at a sufficiently low level in the gate area and may be raised after a suitable skin layer is established near the gate. At lower viscosity, the shear force of the injected material is lower and is therefore less likely to disturb the ink on the second surface of the substrate.

It is also possible to print the graphics on the substrate so that they extend beyond the gating area and into the runner system. In this case, if the ink is disturbed by the flow of the injected material, it will be disturbed in the runner area that will be trimmed off after the part is ejected from the mold.

Of course, runnerless systems or heated gating systems may also be employed. With a runnerless system, the drop diameter must be large enough to sufficiently distribute the pressure or flow into a part, such as a rib, which does. With a heated gating system, the tips of the heated gates be maintained at a temperature sufficiently below the softening temperature of the substrate so as to prevent substrate deformation.

Screen-printing is an example of a suitable technique for producing graphics on the film substrates of the present invention. Screen-printing is essentially a stencil printing process which may now be generated by computer with the aid of various software packages. Its ability to vary and control ink thickness accurately has made it an extremely useful process for the decoration of many different types of plastic substrates.

In screenprinting, a screen or stencil is prepared and bonded to a fine weave fabric which is then tensioned in a rigid frame. Frames may be made of either wood or metal, with metal being preferred. The frame must be dimensionally stable and able to withstand handling during the printing process. Screen fabrics are generally made from metallized polyester, nylon, stainless steel, and most commonly, polyester. The fabric is tightly woven under precise control using dimensionally exact filaments. There are a number of variables that affect ink deposit, including thread diameter, squeegee angle and hardness, emulsion thickness, etc. Higher mesh screens are suggested for formed IMD applications.

The basic screenprinting process involves the use of a flat bed where the substrate is held by vacuum during printing. A frame holder positions the screen and holds it both vertically and horizontally during the printing process. With the screen lowered over the substrate bed and held at the off contact distance by the press, the squeegee carrier moves the blade across the screen at a preset speed, pressure, stroke and angle.

It is important to register artwork during a screenprinting operation. This is normally done by locking the frame into a holder that aligns the frame using pins or holders. The pin alignment method is generally preferred because the artwork can be aligned along with the screen frame. Alignment of the substrate with the print image is done through the use of edge guides, mechanical stops or automatic devices. The first color is aligned by this method and subsequent colors are aligned through the use of targets or gauge marks which are printed along side the artwork.

Once the ink is printed, it must be either dried or cured depending on the ink technology used. If the ink is solvent or water based, then a gas fired or electric dryer can be used to dry the ink. When printing on plastic films, it is important to control the temperature and dwell time in the oven to avoid distorting the film. If a solvent ink is used, it is important to use an oven with good air flow to dissipate the fumes. It is also possible to use an infrared dryer on some ink types, but particular attention must be paid to the temperature control of the system. If the ink is UV curable, many suitable commercial units are available for curing such reactive ink types.

If the final piece is three dimensional, there are two basic techniques for forming 3D IMD parts. For parts having a draw depth greater than ½ inch, thermoforming is suggested. For parts containing detailed alphanumeric graphics or draw depths less than ½ inch, cold forming is preferred.

EXAMPLES OF INVENTION

EXAMPLE Print Decoration & Forming

A film made was printed with a polyester based ink using a 230 mesh screen. The decorated film was then thermoformed at 350–400 F. using a "zero gravity" process. This process comprises a sealed thermoformer that allows the application of positive air pressure under the film during preheating and eliminates film sagging. The decorated laminate film is be dried before forming to remove the water from the polycarbonate layer. The preferred drier conditions are: 250 F. for 15 minutes (10 mil film) and 30 minutes (25 mil film).

A 4"×6" laminated film sample was cut and taped at one end to provide, and decorated and formed, a tab for adhesion testing once the printed film was molded. The film was inserted into the mold of an injection molding machine. The PCCD/PC resin material set forth below was injection molded behind the insert.

| Material | Amount (%) |
|---|---|
| PCCD (2000 poise) | 79.80 |
| PC | 19.80 |
| PEP-Q | 0.1 |
| Phosphite 168 | 0.20 |
| MZP | 0.10 |

SP1010R was previously molded into a personal electronic IMD part as a substrate resin to an ink bearing PC film. The resultant part experienced ink-washout at the injection gate due to the injection pressures and temperatures required to backfill the part with SP1010R. The above 80/20 PC/PCCD blend was chosen as a potential replacement for SP1010R due to its lower viscosity at equal temperatures. The melt capillary curves are shown in FIG. 1 and compare the viscosity of the PC/PCCD blend to that of SP1010R at the same melt temperatures.

Due to its lower viscosity at lower melt temperatures, the PCCD/PC blend was able to backfill the IMD part at a lower injection temperature and pressure then the SP1010R material. A table of these conditions, run on the same tool is shown below for comparison.

| Molding Trial | | | | | | |
|---|---|---|---|---|---|---|
| Temperatures (° F.) | | Injection Speed Profile (%) | | | | |
| 80/20 PCCD/PC | | | | | | |
| Nozzle 1 | 530 | 0.4 | 0 — 4 | 0 — 8 | 1.5 | 1.5 |
| Barrel 2 | 530 | 1.5 | 1 — 5 | 1 — 5 | 1.5 | 1.5 |
| Barrel 3 | 520 | | | | | |
| Barrel 4 | 510 | Injection Boost (PSI) | 90 1 | | | |
| Barrel 5 | 460 | | | | | |
| Barrel 6 | 420 | | | | | |
| SP1010R | | | | | | |
| Nozzle 1 | 510 | 1.5 | 2 | 2 | 2 | 2 |
| Barrel 2 | 540 | 2 | 2 | 2 | 2 | 1.8 |
| Barrel 3 | 540 | | | | | |
| Barrel 4 | 530 | Injection Boost (PSI) | 20 30 | | | |
| Barrel 5 | 510 | | | | | |
| Barrel 6 | 490 | | | | | |

While run at a lower temperature and pressure then the SP1010R, the PCCD/PC blend also resulted in less ink-washout at the injection gate. The washout resulting from the SP1010R material could only be controlled to within 1½ to 2 inches from the injection gate, whereas the ink-washout of the PCCD/PC material could be controlled to within ¼ of an inch.

An example which illustrates the superior low temperature impact of impact modified PC/PCCD blends (blends of PCCD with BPA-PC were prepared and various stabilizers were added to give good color and melt stability) versus PC and Lexan SP. Also these materials were molded in a commercial cell phone front cover tool. The barrel temperatures needed to fill the mold, as mentioned in the table, indicate the very easy processing of the PC/PCCD blend.

| SP1010 | PC105 | PCCD 4000 poise | % impact modifier | transmission at 2 mm | Ductile/ Brittle temp (Izod notch) | barrel setting (° C.) |
|---|---|---|---|---|---|---|
| 100 | | | | 89% | RT | 311 |
| | 48 | 52 | 10% ABS415 | 90% | −22° C. | 284 |
| | 100 | | | 90% | 5° C. | 328 |

Representative applications include eye glass frame, shaver, tooth brush stem, head rest, film yarn, covered wire, pipe joint, hood tray, plaque, car port roof, sign board display, name board, lighting cover, vending machine cover, exhibit partition cover, machine cover or housing, sheet, silencer board, bath tub, draining mass, eaves trough, window, auto glazing, window frame, wall-paper, floor board, house exterior board or roof, clear parts in refrigerator, thermos bottle, microwave oven, washing machine, TV, plastic lens, air conditioner, printer, copier, camera, optical disk, data storage case, relay connector, IC card, ATM, optical disk player, switch, knob, auto key, helmet and other items and articles.

What is claimed is:

1. An article comprising a decorative surface area and an integral formed polymeric base comprising transparent cycloaliphatic polyester resin, wherein the cycloaliphatic polyester resin is free from an aromatic moiety.

2. An article of claim 1 where the cycloaliphatic polyester is comprised of cycloaliphatic diacid and cycloaliphatic diol units.

3. An article of claim 1 where the cycloaliphatic polyester is polycyclohexane dimethanol cyclohexane dicarboxylate (PCCD).

4. An article of claim 2 wherein the injection molded polymeric base comprises a polycarbonate resin.

5. An article of claim 4 wherein the ratio of cycloaliphatic polyester to polycarbonate is in the range of 20:80 to 70:30 by weight of the polymeric base.

6. An article of claim 4 wherein said polycarbonate resin comprises primarily of the following structural units: bisphenol A, Spiro biindane bisphenol, an aryl substituted bisphenol, a cycloaliphatic bisphenol or mixtures thereof.

7. An article of claim 5 where the polycarbonate is BPA-PC and the cycloaliphatic polyester is PCCD.

8. An article of claim 7 wherein said polymeric base has a lower thermal heat deflection temperature as compared to polycarbonate.

9. An article of claim 5 wherein said polymeric base has an enhanced chemical resistance as compared to polycarbonate.

10. An article of claim 5 where the blend has % transmittance of greater than or equal to 75%.

11. An article of claim 5 where the blend has a glass transition temperature of from about 90 to 150° C.

12. An article of claim 5 wherein said resin comprising cycloaliphatic polyester has a lower viscosity at lower melt temperatures as compared to polycarbonate.

13. An article of claim 5 comprising less than up to 20% by weight of an impact modifier.

14. An article of claim 13 wherein said impact modifier is transparent.

15. An article of claim 14 comprising less than about 15 percent transparent impact modifier.

16. An article of claim 15 wherein said transparent impact modifier has a refractive index (RI) between 1.51 and 1.58.

17. An article of claim 16 wherein said impact modifier comprises a acrylonitrile-butadiene-styrene.

18. A method of molding comprising forming a printed substrate into a three-dimensional shape, placing said substrate into a mold, injection molding a resin into the mold cavity space behind the formed substrate, and forming an integral polymeric base, wherein said injection molded resin comprises a transparent cycloaliphatic polyester resin, wherein the cycloaliphatic polyester resin is free from an aromatic moiety.

19. A method of molding according to claims 18 where said shape and said injection molded resin form a single molded part.

20. An method of claim 18 where the cycloaliphatic polyester is comprised of cycloaliphatic diacid and cycloaliphatic diol units.

21. An method of claim 18 where the cycloaliphatic polyester is polycyclohexane dimethanol cyclohexane dicarboxylate (PCCD).

22. An method of claim 18 wherein the injection molded polymeric base comprises a polycarbonate resin.

23. An method of claim 22 wherein the ratio of cycloaliphatic polyester to polycarbonate is in the range of 20:80 to 70:30 by total weight of the polymeric base.

24. A method of claim 22 wherein said polycarbonate resin comprises primarily of the following structural units: bisphenol A, spiro biindane bisphenol, an aryl substituted a bisphenol, a cycloaliphatic bisphenol or mixtures thereof.

25. An method of claim 24 wherein said polymeric base has a lower thermal heat deflection temperature as compared to polycarbonate.

26. An method of claim 25 wherein said polymeric base wherein said polymeric base has an enhanced chemical resistance as compared to polycarbonate.

27. An method of claim 22 where the polycarbonate is BPA-PC and the cycloaliphatic polyester is PCCD.

28. An method of claim 22 where the blend has % transmittance of greater than or equal to 75%.

29. An method of claim 22 where the blend has a glass transition temperature of from about 90 to 150° C.

30. An method of claim 22 wherein the base comprises less than about 70 percent by weight cycloaliphatic polyester.

31. An method of claim 22 comprising less than up to 20% by weight of and impact modifier.

32. A method of claim 22 wherein said impact modifier is transparent.

33. An method of claim 22 comprising less than about 15 percent transparent impact modifier.

34. An method of claim 33 wherein said transparent impact modifier has a refractive index (RI) between 1.51 and 1.58.

35. An method of claim 34 wherein said impact modifier comprises a acrylonitrile-butadiene-styrene.

36. A method of molding according to claim 22 wherein said molded article comprises a decorative film or substrate and an adjacent injection molded polymeric base, and said method includes the steps of:
   a) providing a decorative substrate comprising a polycarbonate resin having one or more colors on a surface;
   b) trimming the decorated substrate or forming and trimming the decorated substrate into a three-dimensional shape;
   c) fitting the decorated substrate into a mold having a surface which matches the three-dimensional shape of the substrate; and
   d) injecting said transparent resin comprising a blend of cycloaliphatic polyester resin and a polycarbonate resin, into the mold cavity behind the printed substrate to produce a one-piece, permanently bonded three-dimensional product.

37. A method of forming a decorative article comprising forming an integral polymeric base adjacent a substrate having a decorative area and transferring a portion of said decorative area to said base, said base comprising a transparent cycloaliphatic polyester resin, wherein the cycloaliphatic polyester resin is free from an aromatic moiety.

38. A method of forming a decorative article according to claim 37 wherein said base is injected against said substrate.

39. A method of forming a decorative article according to claim 38 wherein said substrate is removed from said base.

40. A method of forming a decorative article according to claim 39 wherein said substrate includes a decorative surface and at least a portion of said decorative surface is transferred to said base.

41. A method of forming a decorative article according to claim 40 wherein said transfer of said decorative surface is during said forming.

42. A method of forming a decorative article according to claim 39 wherein said substrate comprises a cycloaliphatic polyester resin.

43. An method of forming a decorative article according to claim 39 wherein the cycloaliphatic polyester is comprised of cycloaliphatic diacid and cycloaliphatic diol units.

44. An method of forming a decorative article according to claim 43 wherein the cycloaliphatic polyester is polycyclohexane dimethanol cyclohexane dicarboxylate (PCCD).

45. An method of forming a decorative article according to claim 44 wherein the injection molded polymeric base comprises a polycarbonate resin.

46. An method of forming a decorative article according to claim 45 wherein the ratio of cycloaliphatic polyester to polycarbonate is in the range of 40:60 to 5:95% by total weight of the polymeric base.

* * * * *